United States Patent [19]
Okamoto et al.

[11] Patent Number: 5,501,114
[45] Date of Patent: Mar. 26, 1996

[54] THREE-DIMENSIONAL FREE MOTION APPARATUS

[75] Inventors: Osamu Okamoto, Higashiyamato; Teruomi Nakaya, Machida, both of Japan

[73] Assignee: National Aerospace Laboratory of Science & Technology, Tokyo, Japan

[21] Appl. No.: 191,125

[22] Filed: Feb. 3, 1994

[30] Foreign Application Priority Data

Sep. 28, 1993 [JP] Japan .................................. 5-263138

[51] Int. Cl.$^6$ ...................................................... B64G 7/00
[52] U.S. Cl. ............................................................ 73/865.6
[58] Field of Search ............................. 73/865.6; 434/34

[56] References Cited

U.S. PATENT DOCUMENTS

| | | | |
|---|---|---|---|
| 3,824,865 | 7/1974 | Evans et al. | 74/5.6 D |
| 4,202,205 | 5/1980 | Carpenter | 73/65.07 |
| 4,798,478 | 1/1989 | Crystal | 384/38 |
| 4,828,403 | 5/1989 | Schwartzman | 384/124 |
| 4,860,600 | 8/1989 | Schumacher | 73/865.6 |
| 4,884,899 | 12/1989 | Schwartzman | 384/124 |
| 5,110,294 | 5/1992 | Brand et al. | 73/865.6 |
| 5,114,244 | 5/1992 | Dunham et al. | 384/103 |
| 5,187,987 | 2/1993 | Anderson et al. | 73/865.6 |
| 5,284,392 | 2/1994 | Ide | 384/119 |
| 5,372,431 | 12/1994 | Ide | 384/122 |

OTHER PUBLICATIONS

Consideration on Simulator for Free–Flying Motion, Miki et al., Space Artificial–Intelligence/Robotics/Automation Symposium'89 Abstract.
NASA Conference Publication 3041, NASA/DOD Controls–Structures Interaction Technology 1989, Third Annual NASA/DOD CSI Conference.
Research And Development at the Marshall Space Flight Center Neutral Buoyancy Simulator, V. P. Kulpa, Space Contruction Conference, Langley Research Center Hampton, VA, Aug. 1986, NASA Conference Publication 2490.
Washington Daily News, p. 32, Mar. 25, 1965.

*Primary Examiner*—Thomas P. Noland
*Assistant Examiner*—Eric S. McCall
*Attorney, Agent, or Firm*—Armstrong, Westerman, Hattori, McLeland & Naughton

[57] ABSTRACT

A floating board is installed on a surface table through an extremely low friction plane sliding and supporting mechanism, such as using a gas bearing, of two-dimensional 3 freedom to thereby constitute a plane sliding mechanism portion, and a vertical sliding shaft tube supported to be enable translation in a vertical direction and connected to a balance belt for applying a balance weight is provided on the floating board through an extremely low friction vertical shaft sliding and supporting mechanism, such as a bas bearing, to thereby constitute a vertical shaft sliding mechanism portion. Further, a spherical shaft is installed above the vertical sliding shaft tube of the vertical shaft sliding mechanism portion through an extremely low friction 3-freedom rotational and supporting mechanism, such as using a gas bearing, to thereby constitute a 3-axis turning rotational mechanism portion, and a specimen model loading portion is provided on the spherical shaft to thereby obtain a three-dimensional free motion apparatus that can be applied to an agravic environment simulation experimental apparatus, an evaluation and test apparatus for a flexible-article handling work robot, and the like, in which as a whole, the 3-axis translation and the motion function of 3-axis turning 6-freedom can be secured in the extremely low friction state.

14 Claims, 8 Drawing Sheets

THREE-DIMENSIONAL FREE MOTION APPARATUS

BACKGROUND OF THE INVENTION

(1) Field of the Invention

The present invention relates to a three-dimensional free motion apparatus, and particularly to a three-dimensional free motion apparatus which can be utilized as a simulation-experimental apparatus under an agravic environment capable of simulating a free motion under the agravic environment, or as an evaluation and test apparatus for a work robot for handling various flexible articles.

(2) Description of the Prior Art

In developments of remote automatic assembling technologies for structures in a space base, space robots for recovering an artificial satellite on the orbit, and the like, it is an indispensable matter to recognize movements of a target satellite and a chaser satellite due to the free motion at the time of docking of said satellites. In the past, various apparatuses for simulating the free motion by a hardware model other than the simulation by way of a motion equation model using a computer have been proposed.

Conventional methods for simulating a free motion under the agravic environment on the earth include (1) an underwater buoyancy system wherein a specimen model is put underwater and the balance of buoyancy is utilized underwater, (2) a suspension balance system wherein a suspension mechanism is combined into a three-dimensional traverse mechanism to utilize a cooperative operation, (3) a multiaxis active control system wherein an object is mounted on an active type motion mechanism in which a multiaxis force/torque sensor is combined with a three-dimensional traverse mechanism, and a servo feedback control is performed so as to cancel a reaction applied to a point of application, and (4) as a method for obtaining a real agravic state in the air, a ballistic flight system using an aircraft or a rocket and a free drop system by way of a drop tower.

However, these conventional systems have the problems as noted below.

(1) In the aforementioned method (1), the buoyancy should be adjusted according to the depth, and since water is used for a buoyancy medium, the water-viscosity affects on the movement, giving rise to a great difference in operation as compared to that under the vacuum environment.

(2) The aforementioned method (2) has a problem in that a compound motion is liable to occur between a suspension fulcrum and a specimen model, and since a sliding friction and an inertia of a 3-axis moving mechanism are great, a complicated movement occurs in the specimen model, failing to simulate the three-dimensional movement.

(3) The aforementioned method (3) has a problem in that the movement is not smooth due to the sensor noise, the inertia force of the mechanism portion, the play or looseness and the delay in control law resulting from the computation speed.

(4) in the aforementioned method (4), the experiment is large-scaled whilst the time is short. This method can be merely applied to the test such as confirmation of behavior by a small type apparatus, and is not suitable for the test for establishment of the elementary technology of a control apparatus having a large type mechanical portion.

On the other hand, the aforementioned conventional three-dimensional free motion simulation apparatus has been merely proposed as a simulation means for the work under the agravic environment, and as an experimental apparatus exclusively for the development of the space such as a space robot. However, a three-dimensional free motion apparatus has not yet been proposed for various applications on the ground, for example, for an evaluation stand or the like, in the development of a robot for handling flexible articles, for simulating a degree of impact or the like applied by the robot to an object to evaluate a flexibility of the robot.

The conventional robot generally employs a multi-articulated arm mechanism and controls the movement by information from a sensor or the like and a predetermined control law. However, this robot has a limitation in terms of mechanism, operating properties and the like, and involves a danger. There still remains a problem not solved for a robot which is gentle with animals and plants including a human being, easily-breakable articles such as glass work, and other flexible articles. Studies on the harmonization between these various conventional type robots and the human being and the like are a future theme. Particularly, the development of a nursing robot to meet people of the great age is an important theme.

In the development of these robots, there has been empolyed a system in which the relationship is established before hand between individual objects such as a human being, flexible articles and the like to determine a gripping pressure, a contact pressure and a control law for a movement or the like. These evaluations are merely applied exclusively to fixed objects. And, there is no apparatus capable of evaluating a true flexibility in the robot. Such an apparatus has been desired to be developed.

SUMMARY OF THE INVENTION

An object of the present invention is to provide a three-dimensional free motion apparatus which can solve the aforementioned problems with resect to the aforementioned conventional free motion simulation apparatus, and which can be also applied to an evaluation apparatus capable of accurately evaluating a flexibility of a robot in the development of a robot for handling the aforesaid flexible articles.

Another object of the present invention is to provide a three-dimensional free motion apparatus which can effect a free motion similar to that under the agravic environment of a three-dimensional 6-freedom by a compound operation of an extremely low friction supporting mechanism, can effect a smooth movement without delay caused by an inertia force, a play and the like of the mechanism portion, and can perform the test for a long period of time at less cost.

A three-dimensional agravic free motion apparatus according to the present invention comprises a plane sliding mechanism portion having a floating board mounted on a surace table through an extremely low friction plane sliding supporting means of a two-dimensional 3-freedom; a vertical shaft sliding mechanism portion supported so as to enable translation in a vertical direction on said floating board through an extremely low friction vertical shaft sliding and supporting means and having a vertical sliding shaft tube connected to a balance belt for applying a balance weight; a 3-axis turning rotational mechanism portion formed above said vertical sliding shaft tube of said vertical shaft sliding mechanism portion and having a spherical shaft mounted thereon through a 3-axis turning extremely low friction 3-freedom rotational and supporting means; and a specimen model loading portion supported on said spherical shaft, characterized in that the motion function of 3-dimensional 6-freedom is attained by the extremely low friction compound motion of said mechanism portions.

Preferably., said extremely low friction plane sliding and supporting means, said extremely low friction vertical shaft sliding and supporting means and said extremely low friction 3-freedom rotational and supporting means respectively comprise gas bearings in which gases are bearing media.

Said vertical siding shaft tube and a bearing supporting tube which constitute said vertical shaft sliding mechanism portion may be fitted with each other so that said vertical sliding shaft tube may be slidably moved in a vertical direction with respect to the bearing supporting tube, said vertical sliding shaft tube being of the type in which it is placed either externally or internally of the bearing supporting tube stationarily set on said floating board. The vertical sliding shaft tube and the sliding gas bearing supporting tube are not limited in shape to be cylindrical but may be a polygonal tubular configuration such as a square tubular configuration.

A gas tank is provided on the floating board so that gases are supplied from the gas tank to gas pads which constitute an extremely low friction bearing to thereby eliminate the necessity of a gas piping connected to the exterior. Further, a power supply is loaded on the floating board, if necessary, whereby the 3-dimensional free motion apparatus may comprise a completley independent system. With this, the 3-dimensional free motion apparatus according to the present invention may comprise a complete independent system without being restricted by an external mechanism and is possible to more accurately simulate the free motion.

An attitude controlling jet nozzle capable of imparting a motion of 2-dimensional 3-freedom to the floating board is provided on the floating board to thereby enable the active control of the floating board. Further, a tension sensor is provided at a connection between the balance belt and the sliding shaft tube, and a linear motor is constituted between a control motor or a balance belt and a fixed portion so as to enable the driving and controlling of the balance belt. Thereby, the looseness of the belt can be corrected on the basis of the detection of the belt tension by the tension sensor, and the remote active control can be made for the sliding shaft.

The specimen model loading portion is provided with a multi-component force sensor on which is mounted a specimen model to thereby enable the detection of an impact force generated between the 3-dimensional free motion apparatus and the specimen model with the multi-component of force, and the motion performance of the specimen model can be analyzed at real time.

The 3-dimensional free motion apparatus according to the present invention can be employed as various test devices, for example, as a 3-dimensional agravic motion simulation apparatus, or as an evaluation test apparatus for a robot on which is loaded a flexible article or an easily-breakable article as a specimen model to handle them or a flexible article handling robot for carrying out the evaluation test such as an influence of a robot on, the object.

According to the 3-dimensional free motion apparatus of the present invention, the floating board can secure the motion functions of 3-freedom of a 2-axis translational motion and a 1-axis rotational motion on the X-Y plane in the extremely low friction state by the extremely low friction plane sliding and supporting means between the surface table and the floating board, and the sliding shaft tube of the vertical shaft sliding mechanism portion can secure the motion function of 1-freedom of a 1-axis translational motion in a Z-axis direction in the extremely low friction state by the extremely low friction vertical shaft sliding and supporting means and the balance belt for applying a balance weight. Furthermore, the 3-axis turning rotational motion function can be secured in the extremely low friction state by the 3-axis turning rotational mechanism portion. Accordingly, the 3-dimensional free motion apparatus according to the present invention can secure the 3-axis translation and the 3-axis turning 6-freedom motion function as a whole in the extremely low friction state, and these function passively, and the 3-dimensional free motion can be achieved.

For example, when the external force of multi-component exerts on the specimen model loaded on the specimen model loading portion, a movement due to a difference of inertia between the strength of an external force and a composite frictional force of the 3-dimensional free motion apparatus occurs, and first the reaction compositely floats since the force is transmitted at real time to the 3-axis turning rotational mechanism portion, the vertical shaft sliding mechanism portion out of the respective mechanism portions of 6-freedom and then to the floating board. That is, when the 3-axis turning force is applied, the spherical shaft of the 3-axis turning rotational mechanism portion rotates; when the vertical force is applied, the sliding shaft tube is slidably moved by the extremely low friction vertical sliding and supporting means and the balance belt; and when the horizontal force is applied, the floating board which floats on the surface table is slidably moved. These mechanisms can be synthesizely functioned to effect a 3-dimensional agravic simulation and to simulate the movement of the specimen model due to the impact extended to the object by the flexible article handling robot or the nursing robot.

Moreover, an attitude controlling jet nozzle is provided on the floating board and a balance belt controlling driving motor is provided thereon to thereby enable the active application of a movement of 2-dimensional 3-freedom in X-Y surface and a movement of 1-freedom in a Z-axis direction, whereby the free motion can be simulated not only with the passive movement but also with the active movement and the realistic movements compared with the docking of satellites in the space can be simulated.

DESCRIPTION OF THE PREFERRED EMBODIMENTS

An embodiment of the present invention will be described hereinbelow with reference to FIG. 1 to FIG. 4.

Figure 1:
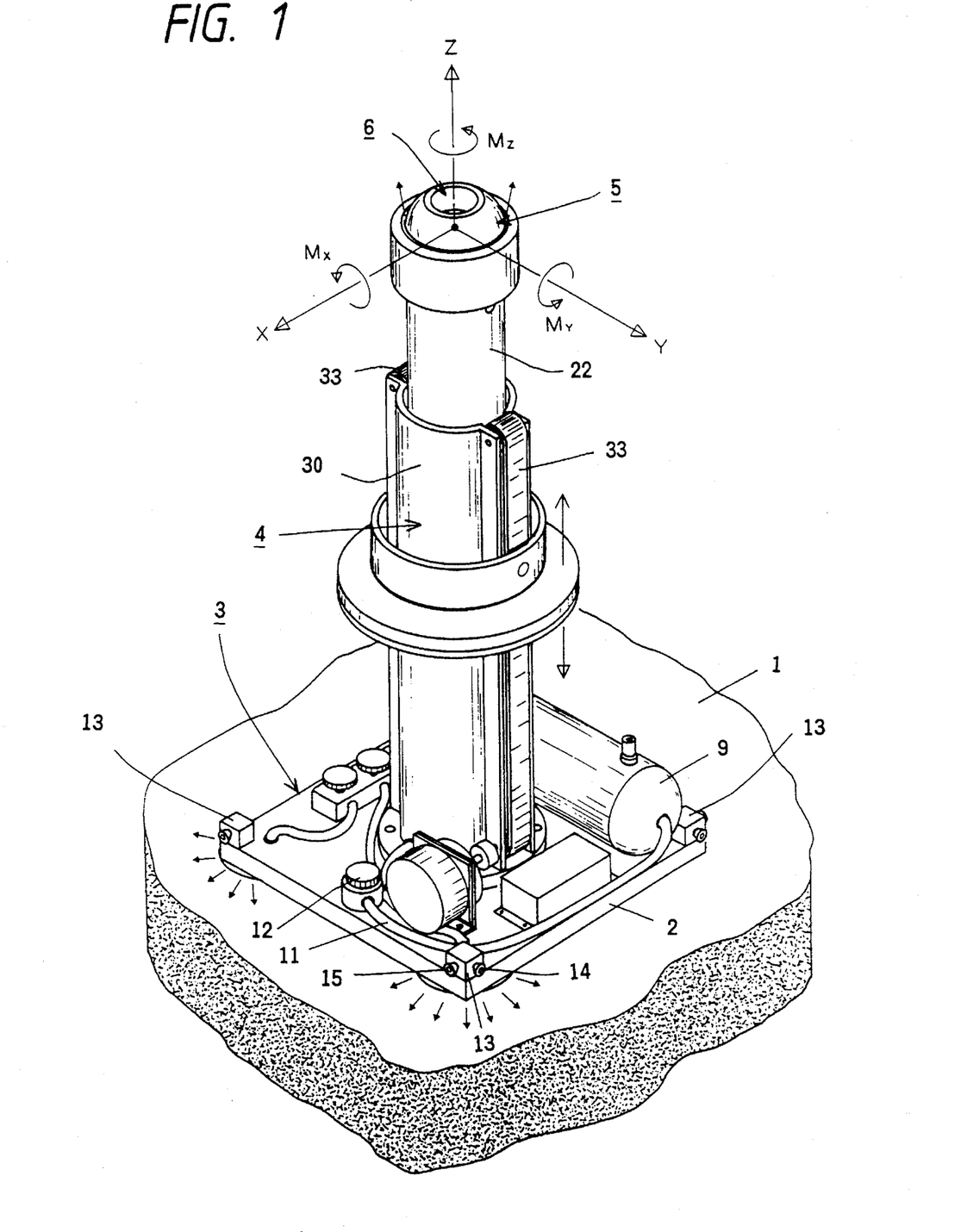
FIG. 1 is a perspective view of a three-dimensional free motion apparatus according to an embodiment of the present invention.
Figure 2:
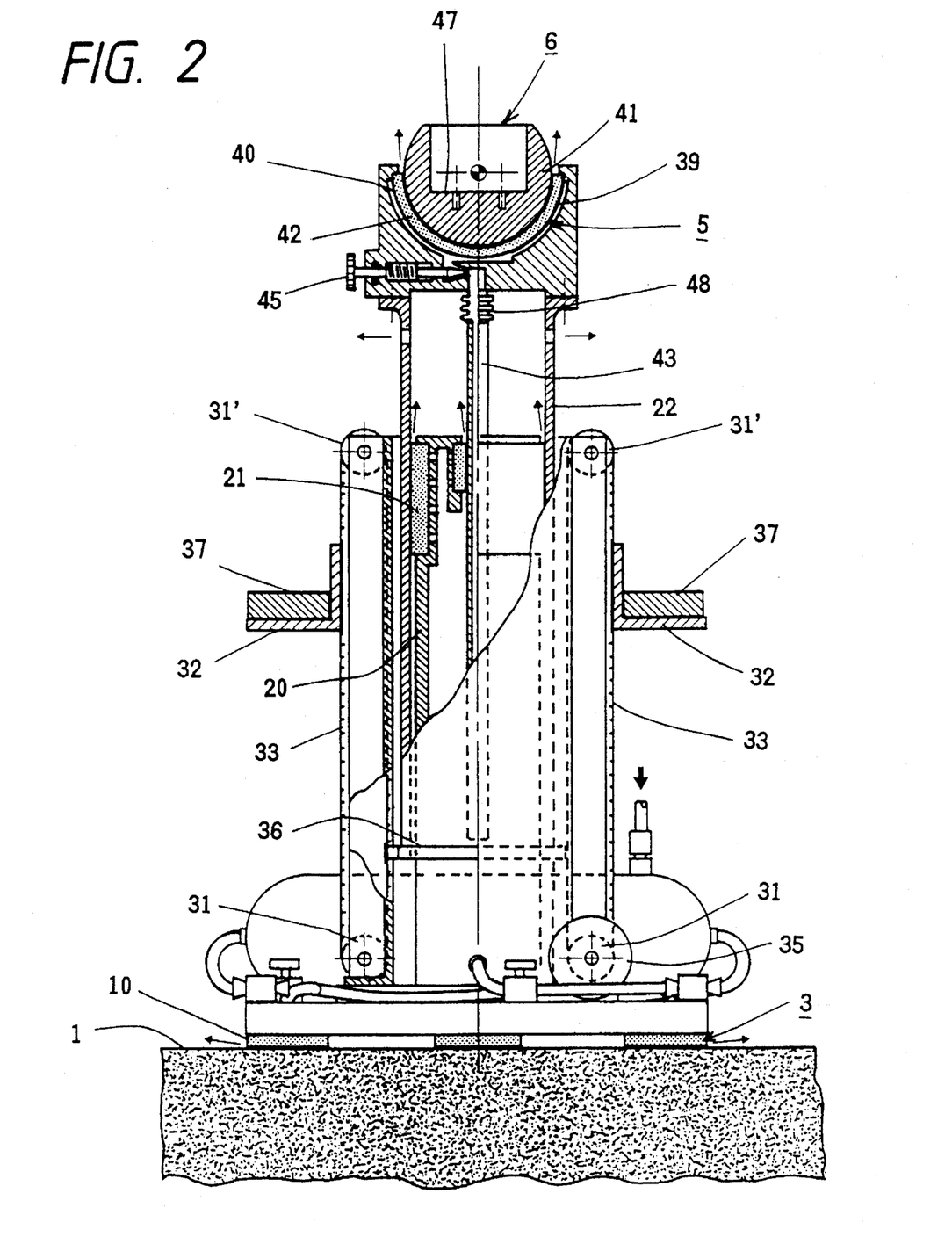
FIG. 2 is a partly sectioned front view of three-dimensional free motion apparatus of FIG. 1.

In a three-dimensional free motion apparatus according to the present embodiment, a floating board 2 is installed on a surface table 1 to constitute a two-dimensional 3-freedom plane sliding mechanism portion 3, a vertical shaft sliding mechanism portion 4 having an extremely low friction 1-axis translational bearing function is suspended on the floating board, and a specimen model loading portion 6 for loading a specimen model or the like through a 3-axis turning rotational mechanism portion 5 having a 3-axis turning 3-freedom extremely low friction motion function above the vertical shaft sliding mechanism portion 4.

In the following, the above-described mechanism portions will be described in detail.

Plane Sliding Mechanism Portion

On the floating board 2 is mounted a gas tank 9 for supplying a gas (generally, a dry air or an inert gas such as nitrogen gas) as an extremely low friction supporting medium to the aforementioned mechanism portions, and at the back thereof is arranged a suitable number of gas pads 10 (FIG. 3) formed of sintered alloy in the form of a flat plate of gas bearings 8 (air bearings) as extremely low friction plane sliding and supporting means so that gases are supplied from the gas tank 9 through a suitable piping 11 and a pressure regulating valve 12. The gases are jetted out of the gas pads 10 so that the floating board 2 is supported under the extremely low friction relative to the surface-table surface (X-Y plane) and has a two-dimensional 3-freedom of the translational motion in the X-Y direction with respect to the surface-table surface and the Z-axis turning rotation and is maintained in the two-dimensional free motion state.

Figure 3:
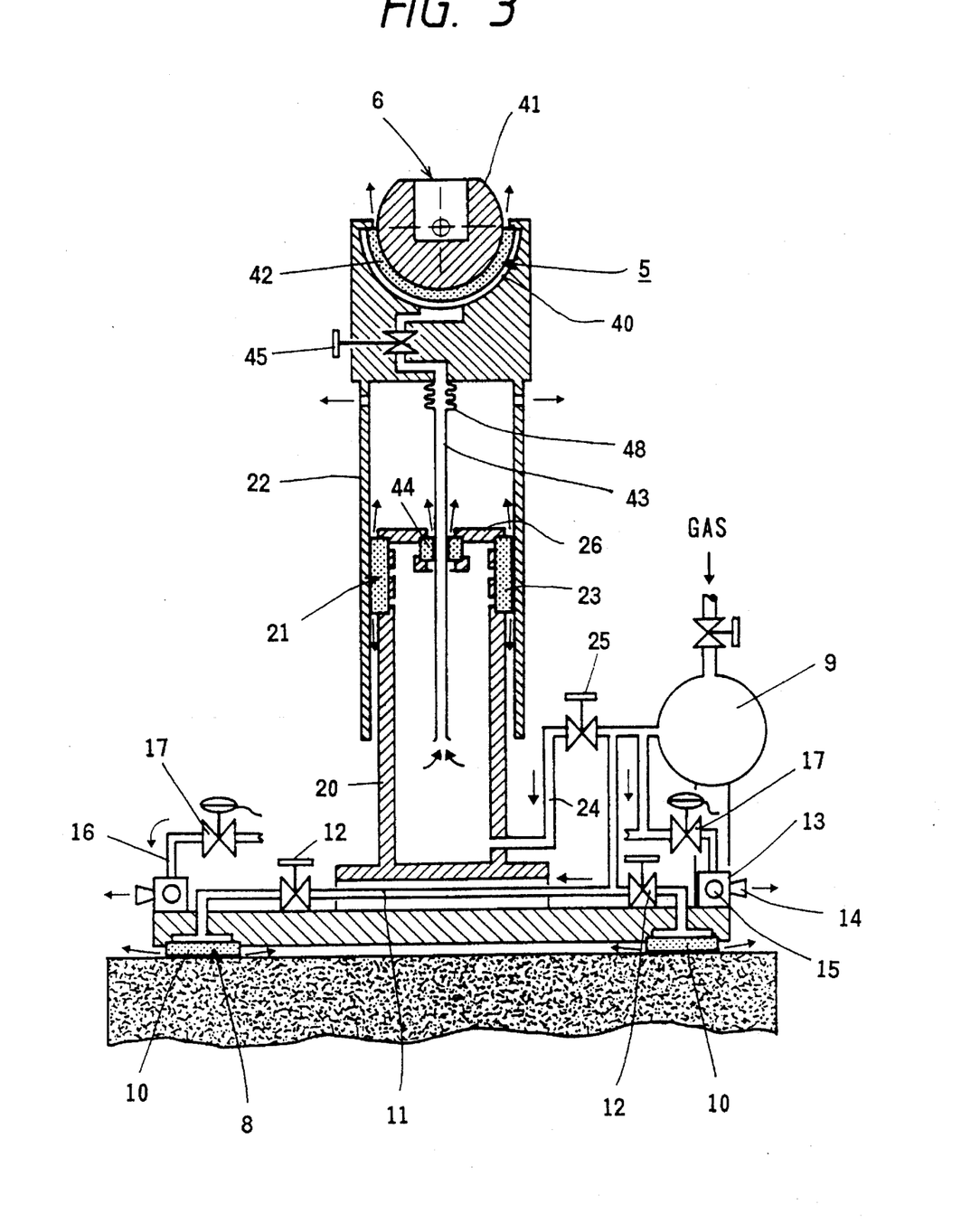
FIG. 3 is a schematic view showing a gas supply construction to a gas bearing and an attitude controlling jet nozzle of an extremely low friction supporting means thereof.

Further, a suitable number of attitude controlling jet nozzles 13 are arranged on the floating board 2 so that a positional attitude control may be made by performing actively the motion of two-dimensional 3-freedom. In the illustrated embodiment, an attitude controlling jet nozzle 13 is constituted by a nozzle body having two nozzles 14 and 15 arranged at right angles, each nozzle body being arranged at each of four corners of the surface table. The attitude controlling jet nozzles 13 are each connected to the gas tank 9 through a piping 16 and a pressure regulating valve 17 so that they can independently control pressure. In the state where the floating board 2 is floated, the gases are jetted out of the attitude controlling jet nozzles 13 whereby the floating board 3 can be moved in the direction opposite the gas jetting direction by the reaction. Accordingly, a suitable combination of jettings of the four jet nozzles enables the translational motion and the X-axis turning rotation to impart a suitable movement within the X-Y plane along the surface table surface thus enabling the control of the attitude.

Vertical Shaft Sliding Mechanism Portion

The vertical shaft sliding mechanism portion 4 comprises a 1-axis translational sliding portion comprising a bearing supporting tube 20 (FIG. 3) secured to the floating board 2 and a sliding shaft tube 22 slidable in a Z-axis direction through a gas bearing 21 as an extremely low friction vertical shaft sliding and supporting means in the outer-periphery of the bearing supporting tube 20, and a balance weight imparting portion for maintaining the sliding shaft tube 22 at a fixed position in a free state while being balanced with the weight of a specimen model.

The gas bearing 21 of the 1-axis translational sliding portion has a cylindrical gas pad 23 provided in the outer surface of the bearing supporting tube 20 so that the gases are jetted from the gas pad surface to the inner surface of the sliding shaft tube to guide and support the sliding shaft tube 22 in the Z-axis direction under the extremely low friction with respect to the bearing supporting tube 20. In the present embodiment, the bearing supporting tube 20 is interiorly sealed, and the gases are supplied into the bearing supporting tube 20 through a piping 24 and a pressure regulating valve 25 from the gas tank 9 so that gases for sliding are jetted out of the surface of the gas pad 23.

Figure 4:
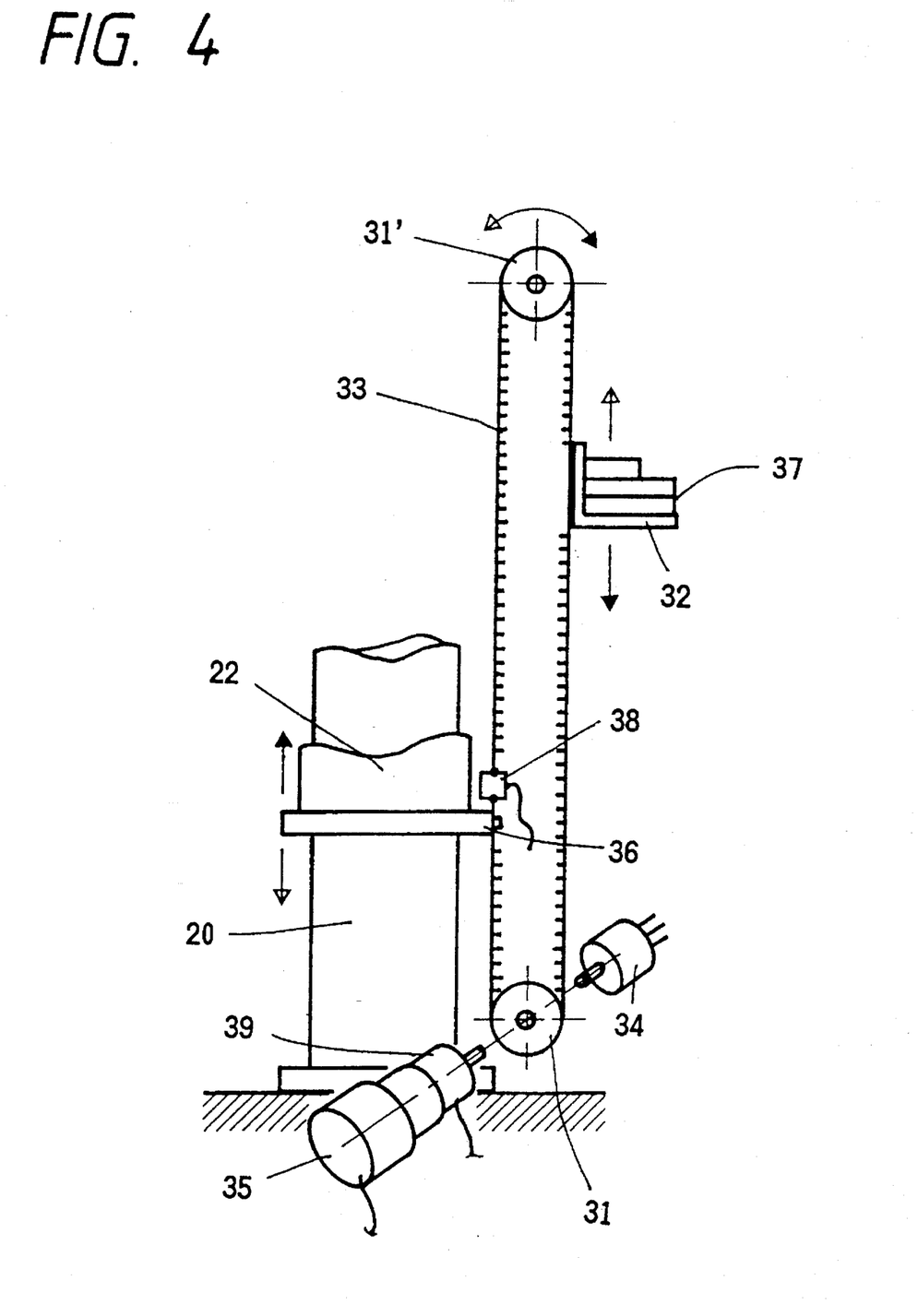
FIG. 4 is a schematic view showing the construction of a vertical shaft sliding mechanism portion.

The balance weight imparting portion has two sets of balance belts 33 and 33 having a balance weight supporting portion 32 vertically passed over between two sets of pulleys 31 and 31', each pair of which consists of upper and lower pulleys, supported on a bracket 30 secured onto the floating board 2, and the sliding shaft tube 22 has its lower end supported on the balance belt through a connector 36 (FIGS. 2 and 4). A balance weight 37 having a weight balanced with the weight of the specimen model is placed on the balance weight supporting portion 32 whereby the specimen model is maintained in a substantially free motion state in the Z-axis direction at a balanced position.

Normally, the pulleys 31 and 31' are supported in a free rotational state while in the present invention, the one pulley 31 is operatively connected to a motor 35 provided with a locating rotary encoder 34 through a clutch brake 39, as shown in FIG. 4 so that the positions of the balance belts 33 and 33 can be actively controlled. Further, a tension sensor 38 is provided at a connection between the sliding shaft tube 22 and the balance belt 33 so that tension is detected while being adjusted to the movement of the sliding shaft tube 22, and the motor 35 is controlled in response to the variation of the tension so as to always maintain constant the tension acting on the balance belt thereby enabling the elimination of a non-linearity due to the hysteresis phenomenon or the like resulting from the looseness of the balance belt. Further, the motor is driven by the remote control whereby the balance belt can be rotated and the sliding shaft tube 22 can be forcibly moved in the Z-axis direction to move the specimen model to a suitable position in the Z-axis direction.

3-Turning Rotational Mechanism Portion

The 3-axis rotational mechanism portion 5 (FIGS. 2 and 3) is constructed such that a semispherical gas bearing depressed portion 40 is formed in a central portion at the upper end of the sliding shaft tube 22 and a semi-spherical gas pad 42 is provided adjacent to a spherical shaft 41 fitted in the gas bearing depressed portion to constitute a gas bearing 39 so that a 3-axis turning 3-freedom extremely low friction motion function is provided between the sliding shaft tube 22 and the spherical shaft 41.

Gases to the gas pad 42 are supplied from the bearing supporting tube 20 through a pipe 43, which is supported at the lower end of a gas bearing portion 40, extends through the sliding shaft tube 22, is coupled by a bellows or a flexible coupling 48 and extends into the bearing supporting tube 20. Reference numeral 44 designates a sliding gas pad provided at an opening of the top wall so that the pipe 43 may be slidably moved under the extremely low friction with respect to the top wall 26 of the bearing supporting tube 20, and reference numeral 45 designates a pressure regulating valve.

Specimen Model Loading Portion

The specimen model loading portion 6, in the present embodiment, is constructed such that a specimen model can be loaded on the spherical shaft 41 of the 3-axis turning rotational mechanism portion 5, and the spherical shaft 41 is formed at the top with a mounting seat 47 so as to suitably mount a specimen model.

In the above-described embodiment, the floating board 2, the bearing supporting tube 20, the sliding shaft tube 22, the spherical shaft 41 and the like are formed of light-weighted hard ceramics material.

The apparatus according to the present embodiment is constructed as described above. The 2-axis translational motion in the X-Y plane and the 3-freedom motion function of the 1-axis rotational motion can be secured in the extremely low friction state between the surface table 1 and the floating board 2, the 1-freedom motion function of the 1-axis translational motion can be secured between the bearing supporting tube 20 and the sliding shaft tube 22, and the 3-freedom motion function of the 3-axis turning rotational motion is obtained between the spherical gas bearing portion 40 and the spherical shaft 41. As a whole, the 3-axis translation and the motion function of the 3-axis turning 6-freedom can be secured in the extremely low friction state. Accordingly, the three-dimensional free motion apparatus is obtained.

Figure 5:
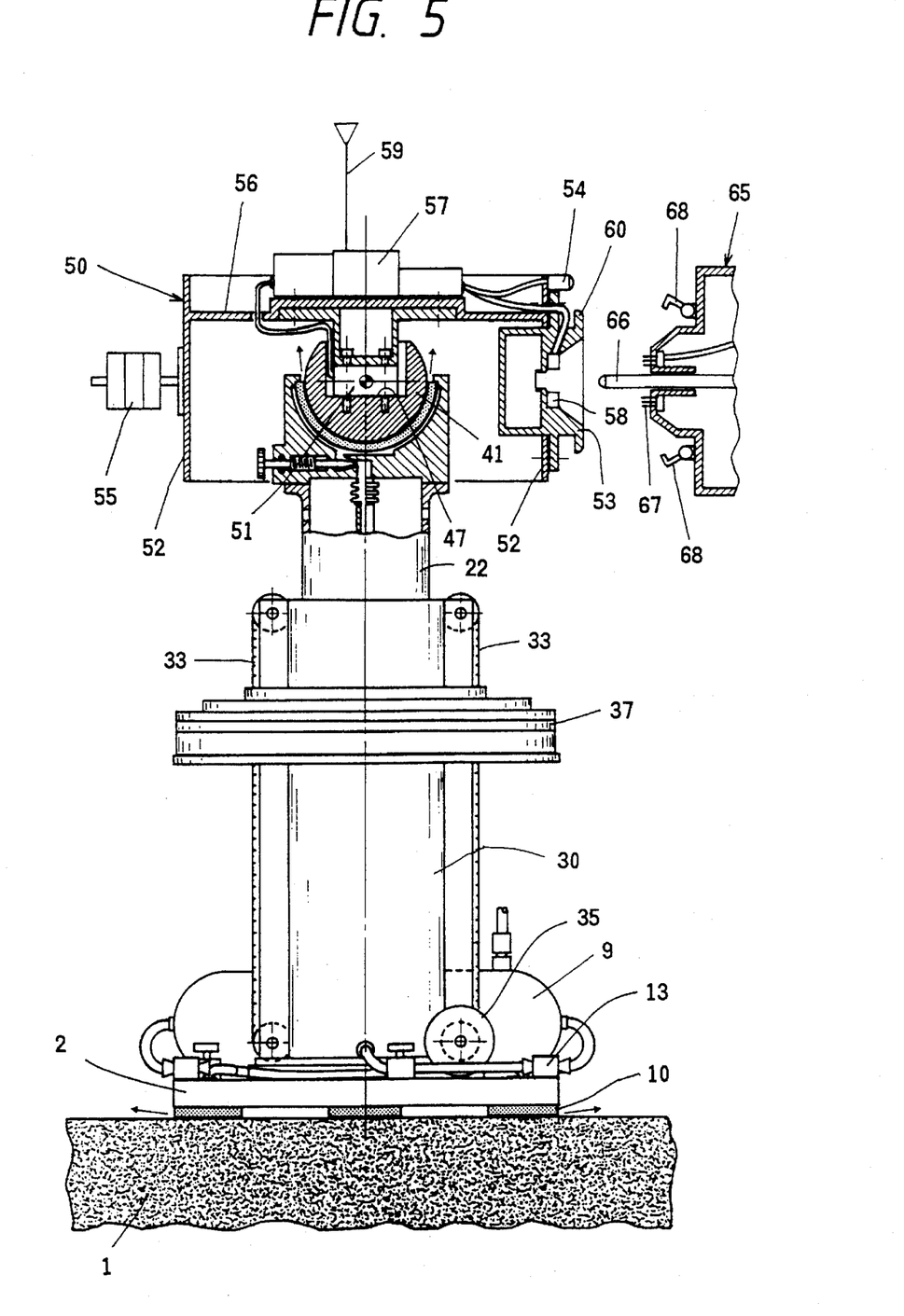
FIG. 5 is a partly sectioned front view of a three-dimensional free motion apparatus according to the present invention in the state where a specimen model is loaded in an agravic motion simulation experiment.

FIG. 5 shows an example of the case applied to an experimental apparatus in which a satellite model on the target side is mounted as a specimen model 50 to simulate a free motion at a space in order to experiment a movement of a satellite on the target side or a satellite on the chaser side at the time of docking of artificial satellites together using the three-dimensional free motion apparatus in accordance with the above-described embodiment.

The specimen model 50 is mounted on an impact-force evaluating force sensor 51 comprising a 6-component force sensor secured to a mounting seat 47 of a spherical shaft 41 so that the impact force generated between the three-dimensional free motion apparatus and the specimen model can be detected. Thereby, the evaluation of the motion properties, operating properties and control laws of the specimen model can be carried out. The specimen model 50 in the present embodiment is formed into a box-like configuration whose bottom is opened, and a skirt wall 52 thereof is provided with a drogue 53 coupled to a coupling probe 66 of a satellite model 65 on the chaser side and a monitor sensor 54, for example, such as a CCD camera for monitoring the satellite on the chaser side whereas a skirt wall on the opposite side thereto is provided with a balancer 55, whose weight is adjusted so that the whole specimen model is balanced horizontally. A control unit 57 is mounted on the top wall 56 to transmit informations from the impact-force evaluating sensor 51, the monitor sensor 54 and the drogue 53 to an external computer and the like and to receive a command from the exterior so as to control various actuators within the motion apparatus.

In FIG. 5, reference numeral 58 designates an electric connector provided on the drogue 53 so that when the satellite model 65 on the chaser side is docked, an electric terminal of the satellite model on the chaser side can be connected. Reference numeral 59 designates an antenna, and reference numeral 60 designates a locking flange at which a latch 68 of the satellite model on the chaser side is locked.

The simulation free motion with the specimen model mounted as described above will be carried out in the following manner.

The specimen model 50 is mounted on the impact force evaluation sensor 51 and the gases are supplied from the gas tank 9 to the respective gas bearing portions to secure the extremely low friction support of the bearing portions, and the balance weight is adjusted so that the own weight of the vertical sliding shaft 22 with the specimen model 50 loaded thereon is balanced with the balance weight 37 supported on the balance belt 33. In this state, the specimen model is supported in the extremely low friction state and in the free state similar to the outer space. The three-dimensional simulation free motion is carried out by the action of the external force.

When the satellite model 65 on the chaser side comes close to the specimen model 50 so that the probe 66 and the drogue 53 are connected for docking, the specimen model 50 supported on the three-dimensional free motion apparatus effects the free motion due to the shock generated at the time of the docking. The impact forces generated between the three-dimensional free motion apparatus and the specimen model at that time are sequentially detected as 6-component by the impact force evaluating sensor 51, transmitted from the control unit 57 and analyzed at real time by the external information processing unit to enable the evaluation of the motion properties and operating properties of the specimen model.

Further, this free motion apparatus has an active control mechanism. Therefore, when the satellite model on the target side of the specimen model 50 and the satellite model 65 on the chaser side are docked, the position of the satellite model 65 on the chaser side which comes closer is detected by the monitor sensor 54 and the attitude of the specimen model can be controlled so that drogue is accurately registered with the probe direction on the basis of the detection signal of the monitor sensor 54. Namely, the gases are allowed to jet out of the attitude controlling jet nozzle 13 on the basis of the detection signal of the monitor sensor 54 so that the attitude of the specimen model can be controlled so that the drogue is accurately directed at the probe direction. Further, the control motor 35 can be driven to rotate the balance belt 33 thereby controlling the height position of the specimen model. By the compound motion thereof, it is possible to control the drogue of the specimen model in its position while adjusting to the probe which comes closer and to more accurately simulate the docking process of the artificial satellite at the outer space. Accordingly, according to the present embodiment, by jetting gases out of the attitude controlling jet nozzle 13, it is possible to simulate the motion of the specimen model caused by the reaction thereof.

Figure 6:
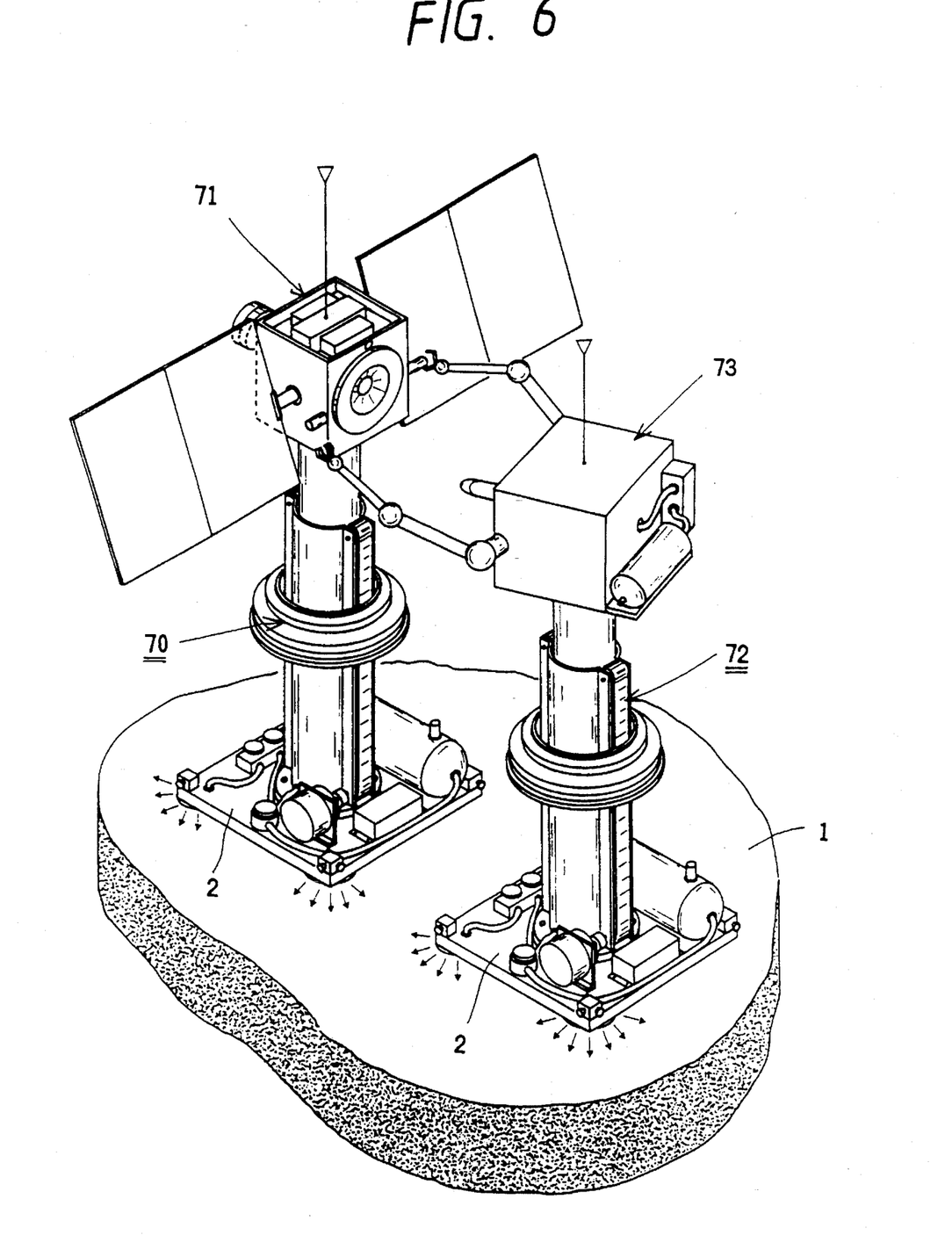
FIG. 6 is a perspective view showing the state where an agravic motion simulation experiment is conducted using two three-dimensional free motion apparatuses according to the present invention.

FIG. 6 shows an experimental apparatus, which uses two free motion apparatuses according to the present invention so that an artificial satellite model 71 on the orbit is mounted as a specimen model on one free motion apparatus 70 and a space robot model 73 for repairing the artificial satellite model is mounted on the other free motion apparatus 72, and they are actually actively controlled to experiment the motion performance under the agravic environment thereof when the space robot captures the artificial satellite.

By using the two apparatuses according to the present embodiment as described above, it is possible to support both the apparatuses in the state of rendering the three-dimensional free motion possible to interfere with each other so as to more accurately simulate the actual movement in space. It is a great feature for the apparatus of the present embodiment, which apparatus itself is constituted by a completely independent system and can be actively controlled, to be able to simulate the free motions of the individual specimen models as used by combining two or more free motion apparatuses to interfere with one another as described above. This feature cannot be achieved by the aforementioned conventional methods (1) to (5).

Figure 7:
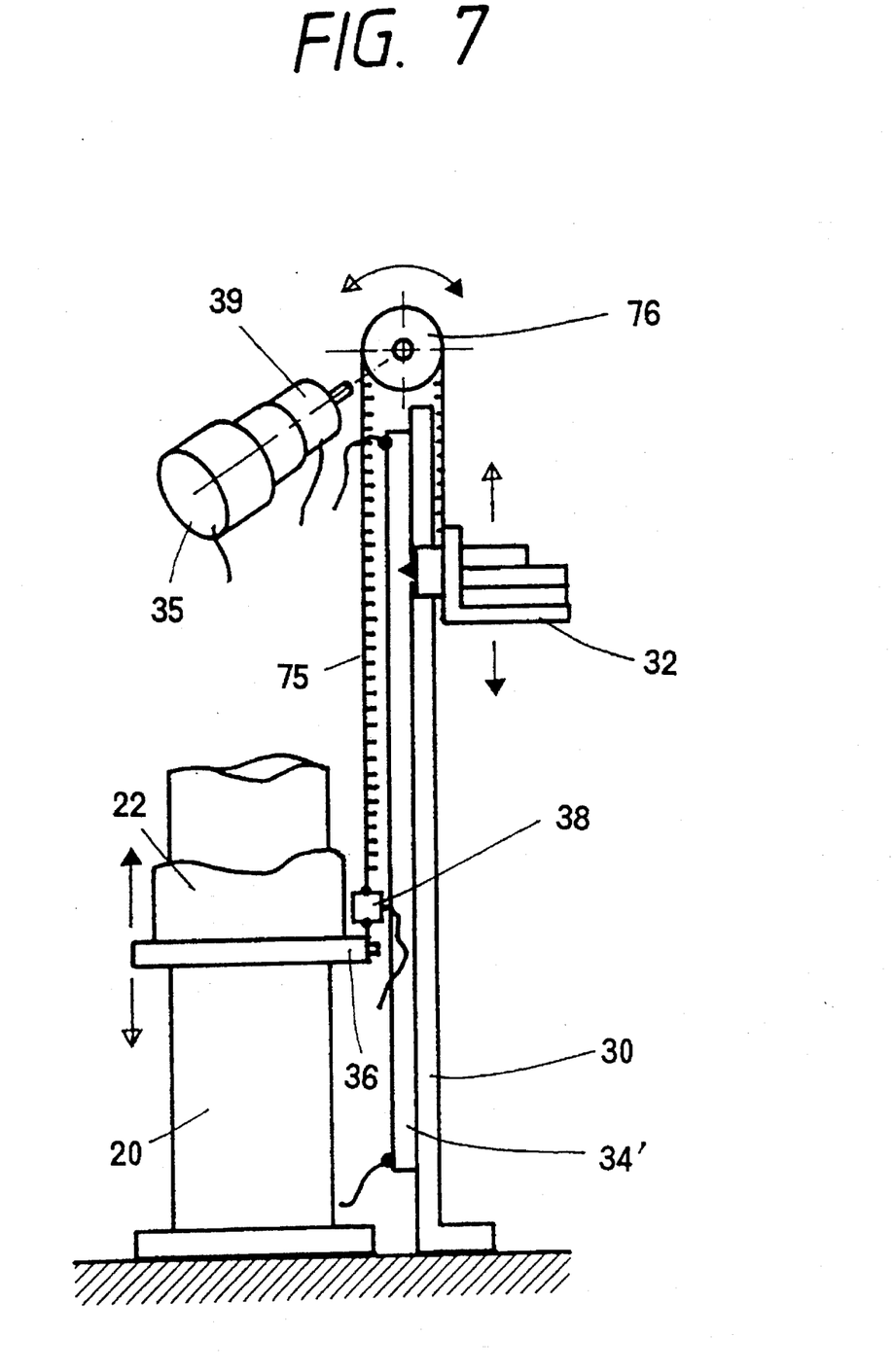
FIG. 7 is a schematic view showing the construction of a vertical shaft sliding mechanism portion according to another embodiment.

FIG. 7 shows another embodiment of the free motion apparatus according to the present invention. Members similar to those used in the above-described embodiments are indicated by the same reference numerals. In the free motion apparatus in accordance with this embodiment, a balance belt 75 in the vertical shaft sliding mechanism portion comprises a belt with ends, one end of which is connected to the sliding shaft tube 22 through the tension sensor 38, while the balance weight supporting portion 32 is connected to the other end thereof located on the opposite side passing through the pulley 76. The motor 35 is connected to the pulley 76 through a clutch brake 39. The motor is normally disconnected from the pulley, and when the active control takes place, the motor is connected thereto to rotate the pulley so that the sliding shaft tube can be displaced. It is to be noted in the present embodiment that a locating non-contact type linear encoder 34' in place of a rotary encoder is provided on the bracket 30 to detect the moving amount of the balance belt so as to control the motor.

Figure 8:
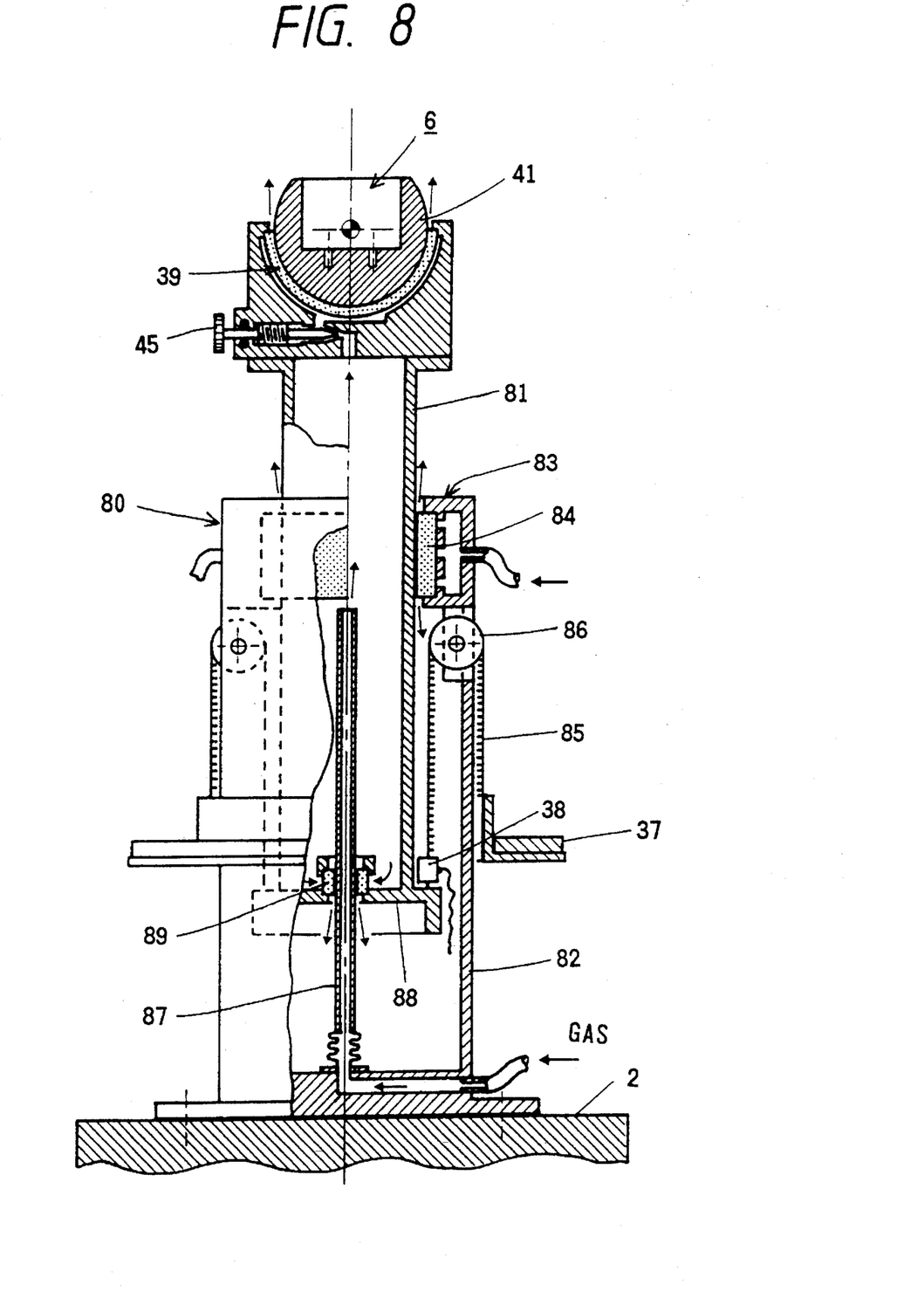
FIG. 8 is a partly sectioned front view of a three-dimensional free motion apparatus according to still another embodiment.

FIG. 8 shows still another embodiment of the free motion apparatus according to the present invention. In the free motion apparatus 80 in accordance with this embodiment, the fitting relationship between the sliding shaft tube and the bearing supporting tube which constitute the vertical shaft sliding mechanism portion is reversed to the previously described embodiment, and a sliding shaft tube 81 is inserted into a bearing supporting tube 82. A gas bearing 83 as an extremely low friction vertical shaft sliding and supporting means is supported on the top of the bearing supporting tube 83. The inner peripheral surface of a gas pad 84 of the gas bearing 83 faces to the outer peripheral surface of the sliding shaft tube 81 to jet gases whereby the sliding shaft tube is slidably supported axially under the extremely low friction. In the present embodiment, the bearing supporting tube 82 also serves as a supporting means for a pulley 86 which winds a balance belt 85.

On the other hand, the interior of the sliding shaft tube 81 also serves as a pipeline for supplying gases to the 3-axis turning rotational mechanism portion. A gas supply pipe 87 standing upright on the bottom of the bearing supporting tube 82 extends from the bottom wall 88 of the sliding shaft tube 81 into the sliding shaft so that the gases for the bearing are supplied to a hollow portion of the sliding shaft. It is to be noted that a gas bearing 89 for sliding the vertical shaft is provided at a part through which the gas supply pipe 87 of the bottom wall 88 extends.

Since other structures are similar to those shown in the previous embodiment, the same reference numerals are applied to the similar members, the detailed description of which will be omitted.

The present invention is not limited to the above-described embodiments but various changes in design can be made within the scope of the technical idea thereof.

For example, it may be constructed such that as an active control means for the vertical sliding mechanism portion, a permanent magnet constituting a linear motor is mounted on a part of a balance belt, an electromagnetic coil is provided on a fixed part of a floating board such as a bearing supporting tube so as to correspond to the permanent magnet to constitute a linear motor mechanism between the balance belt and the fixed part of the floating board, and the balance belt can be actively controlled in non-contact fashion. It is further to be noted that the linear motor mechanism is not limited between the balance belt and the floating board, but the pulley itself may be used as a rotor for the linear motor.

Furthermore, while the above-described embodiment, gases are supplied to the gas bearings from the gas tank provided on the floating board, it is to be noted that a gas tank is separately provided on the siding shaft so as to supply gases to the gas bearings of the 3-axis turning rotational mechanism portion.

What is claimed is:

1. A three-dimensional free motion apparatus comprising: a plane sliding mechanism portion having a floating board mounted on a surface table through an extremely low friction plane sliding supporting means of a two-dimensional 3-freedom; a vertical shaft sliding mechanism portion supported on said floating board and a vertical sliding shaft tube supported so as to enable translation in a vertical direction on said vertical shaft sliding mechanism through an extremely low friction vertical shaft sliding and supporting means, and said vertical sliding shaft tube being connected to a balance belt for applying a balance weight; a 3-axis turning rotational mechanism portion formed above said vertical sliding shaft tube of said vertical shaft sliding mechanism portion and having a spherical shaft mounted thereon through a 3-axis extremely low friction 3-freedom rotational and supporting means; and a specimen model loading portion supported on said spherical shaft.

2. A three-dimensional free motion apparatus according to claim 1, wherein said extremely low friction plane sliding and supporting means, said extremely low friction vertical shaft sliding and supporting means and said extremely low friction 3-freedom rotational and supporting means respectively comprise gas bearings in which gases are bearing media.

3. A three-dimensional free motion apparatus according to claim 1 or 2, wherein said vertical sliding shaft tube is inserted externally of the bearing supporting tube stationarily set on said floating board.

4. A three-dimensional free motion apparatus according to claim 1 or 2, wherein said vertical sliding shaft tube is inserted internally of the bearing supporting tube stationarily set on said floating board.

5. A three-dimensional free motion apparatus according to claim 2, wherein a gas tank is loaded on said floating board so that gases to gas bearings constituting said extremely low friction 3-freedom rotational and supporting means are supplied through said vertical sliding mechanism portion from said gas tank.

6. A three-dimensional free motion apparatus according to claim 1 or 2, wherein a tension sensor for detecting the tension of the belt is provided at a connection between said balance belt and said sliding shaft tube, and a control motor is provided to control the rotation of a pulley on which said balance belt is wound.

7. A three-dimensional free motion apparatus according to claim 1 or 2, wherein a multi-component force sensor for detecting an impact force generated between a specimen model loaded on the specimen model loading portion and the present apparatus is provided on said specimen model loading portion.

8. A three-dimensional free motion apparatus according to claim 1 or 2, wherein said balance belt is constituted by more than two belts.

9. A three-dimensional free motion apparatus according to claim 1 or 2, wherein said three-dimensional free motion apparatus comprises a three-dimensional agravic motion simulation apparatus.

10. A three-dimensional free motion apparatus according to claim 1 or 2, wherein said three-dimensional free motion apparatus comprises an evaluation and test apparatus for a flexible-article handling work robot for carrying out the evaluation test of impacts or the like applied to objects by a work robot for handling flexible articles and living things or easily breakable articles, or a nursing robot for nursing a human being.

11. A three-dimensional free motion apparatus comprising:

a plane sliding mechanism portion having a floating board mounted on a surface table through an extremely low friction plane sliding supporting means of a two-dimensional 3-freedom; a vertical shaft sliding mechanism portion supported so as to enable translation in a vertical direction on said floating board through an extremely low friction vertical shaft sliding and supporting means and having a vertical sliding shaft tube connected to a balance belt for applying a balance weight; a 3-axis turning rotational mechanism portion formed above said vertical sliding shaft tube of said vertical shaft sliding mechanism portion and having a spherical shaft mounted thereon through a 3-axis extremely low friction 3-freedom rotational and supporting means; and a specimen model loading portion supported on said spherical shaft; and wherein an attitude controlling jet nozzle for actively controlling said floating board is provided on said floating board.

12. A three-dimensional free motion apparatus comprising:

a plane sliding mechanism portion having a floating board mounted on a surface table through an extremely low friction plane sliding supporting means of a two-dimensional 3-freedom; a vertical shaft sliding mechanism portion supported so as to enable translation in a vertical direction on said floating board through an extremely low friction vertical shaft sliding and supporting means and having a vertical sliding shaft tube connected to a balance belt for applying a balance weight; a 3-axis turning rotational mechanism portion formed above said vertical sliding shaft tube of said vertical shaft sliding mechanism portion and having a spherical shaft mounted thereon through a 3-axis extremely low friction 3-freedom rotational and supporting means; and a specimen model loading portion supported on said spherical shaft; and wherein a permanent magnet constituting a linear motor is mounted at a part of said balance belt, an electromagnetic coil constituting the linear motor is secured to a fixed part on said floating board, and a linear motor mechanism is constituted between said balance belt and the fixed part of the floating board.

13. A three-dimensional free motion apparatus, comprising:

a plane sliding mechanism portion having a floating board mounted on a surface through an extremely low friction plane sliding supporting means of a two-dimensional 3-freedom; a vertical shaft sliding mechanism portion supported so as to enable translation in a vertical direction on said floating board through an extremely low friction vertical shaft sliding and supporting means and having a vertical sliding shaft tube connected to a balance belt for applying a balance weight; a 3-axis turning rotational mechanism portion formed above said vertical sliding shaft tube of said vertical shaft sliding mechanism portion and having a spherical shaft mounted thereon through a 3-axis extremely low friction 3-freedom rotational and supporting means; and a specimen model loading portion supported on said spherical shaft;

wherein said extremely low friction plane sliding and supporting means, said extremely low friction vertical shaft sliding and supporting means and said extremely low 3-freedom rotational and supporting means respectively comprise gas bearings in which gases are bearing media; and wherein an attitude controlling jet nozzle for actively controlling said floating board is provided on said floating board.

14. A three-dimensional free motion apparatus, comprising:

a plane sliding mechanism portion having a floating board mounted on a surface table through an extremely low friction plane sliding supporting means of a two-dimensional 3-freedom; a vertical shaft sliding mechanism portion supported so as to enable translation in a vertical direction on said floating board through an extremely low friction vertical shaft sliding and supporting means and having a vertical sliding shaft tube connected to a balance belt for applying a balance weight; a 3-axis turning rotational mechanism portion formed above said vertical sliding shaft tube of said vertical shaft sliding mechanism portion and having a spherical shaft mounted thereon through a 3-axis extremely low friction 3-freedom rotational and supporting means; and a specimen model loading portion supported on said spherical shaft;

wherein said extremely low friction plane sliding and supporting means, said extremely low friction vertical shaft sliding and supporting means and said extremely low 3-freedom rotational and supporting means respectively comprise gas bearings in which gases are bearing media; and wherein a permanent magnet constituting a linear motor is mounted at a part of said balance belt, and electromagnetic coil constituting the linear motor is secured to a fixed part on said floating board, and a linear motor mechanism is constituted between said balance belt and the fixed part of the floating board.

* * * * *